Feb. 5, 1957 C. STURARI 2,780,321
ADJUSTABLE SHOCK ABSORBER
Filed Jan. 7, 1953 3 Sheets-Sheet 3

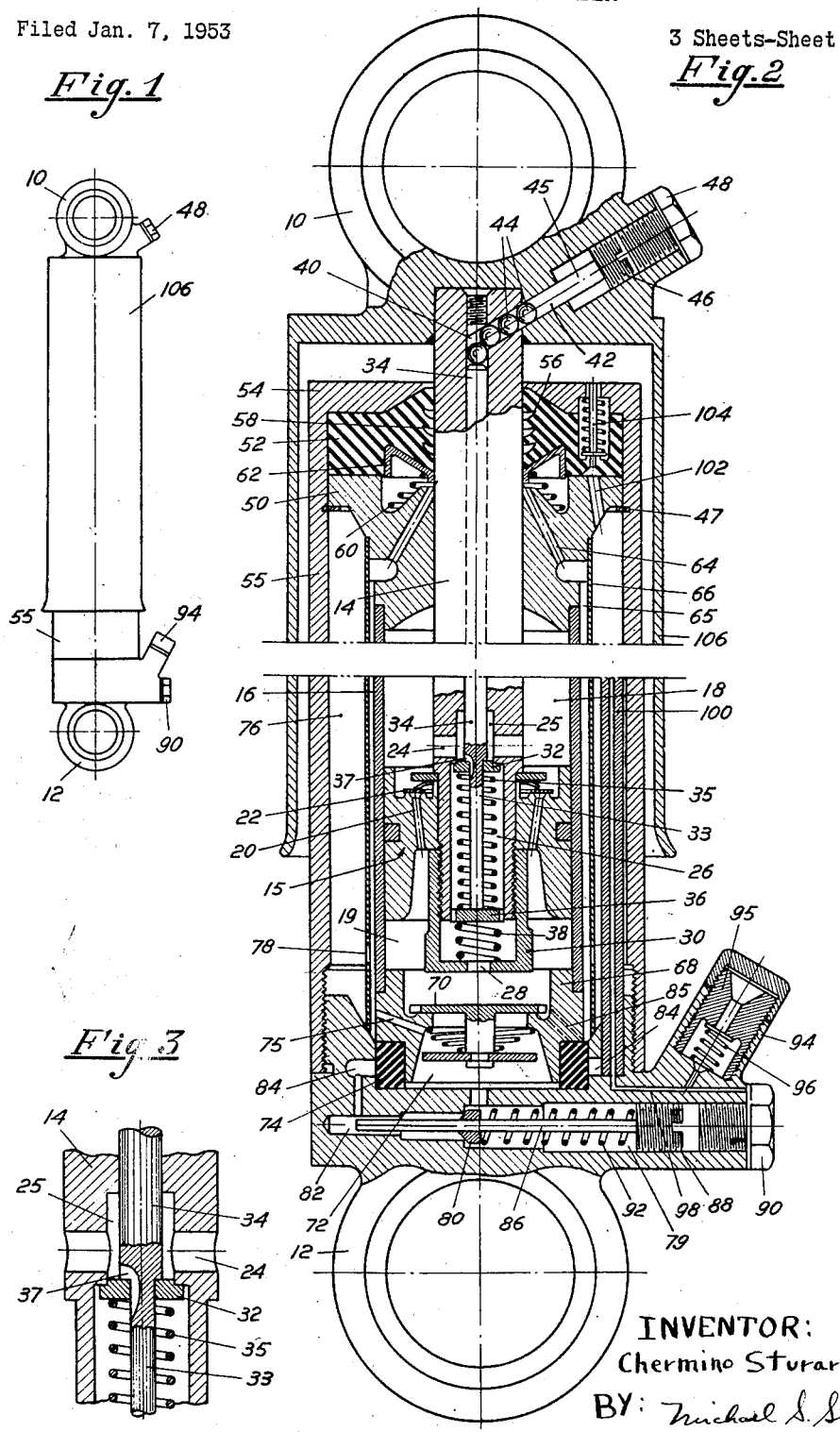

INVENTOR:
Chermino Sturari
BY

United States Patent Office 2,780,321
Patented Feb. 5, 1957

2,780,321

ADJUSTABLE SHOCK ABSORBER

Chermino Sturari, Milan, Italy

Application January 7, 1953, Serial No. 330,010

Claims priority, application Italy January 15, 1952

12 Claims. (Cl. 188—88)

This invention relates to a fluid-dynamic shock absorbed, particularly for motor cars.

Shock absorber, as f. i. of the hydraulic-pneumatic type, utilized for shock damping-out purposes on working components in general, show all a heavy drawback, due to the fact that the shock damping-out action varies according to the more or less worn condition of movable elements thereof.

Due to wear which occurs on the sliding surfaces of piston and cylinder, a clearance is formed between the originally smooth fitting sliding elements, with consequent blowthrough of the fluid, in addition to normal flow or squeezing thereof through the conventional small calibrated orifices, which results in an unforeseen and undesirable variation of shock damping-out action exerted by the device.

The above drawback is positively prevented in the shock absorber according to the invention, which allows also to easily and readily compensate the increase in the free section of passage for the fluid of shock absorber, due to gradually increasing clearance, thus keeping constant the shock damping-out action.

In addition to above stated main purpose, the shock absorber according to the invention also allows to adjust its shock damping-out action in one and/or in the other direction. Such an adjustment can be effected within wide limits and, when required, a zero shock damping-out action—i. e. a condition of complete rigidity—can also be obtained.

A further purpose of the invention consists in the provision of a shock absorber wherein resilient means are interposed between the movable components (i. e. cylinder and piston) and the component parts through which same movable elements are connected with the elements to be damped-out, in order to keep the two movable elements of shock absorber in their coaxial position while in operation, and to absorb the sudden and hard shocks which might occur, and that could not be efficiently damped-out in the practice, due to inertia of components by which the shock absorber is made-up.

A further purpose consists in the provision of a shock absorber which can operate whatever might be the position in which it is fitted and/or it is brought while in operation, without the least damage to the efficiency of its operation.

The shock absorber according to the invention is characterized in that it comprises adjusting means which can be operated from the outside in order to vary the free section of passages or metering ports through which the chambers, as defined by the piston in the cylinder, are put into communication with each other.

In an advantageous embodiment form shock absorber, of the type wherein the piston is provided with the calibrated orifices or metering ports through which the chambers in the cylinder are put into communication with each other, the piston rod is longitudinally bored and a control rod acting on a throttling element combined with at least a part of said orifices is conveniently fitted into said bore. The opposite end of said piston rod is connected with control elements which can be actuated from the outside.

The aforestated control elements could advantageously consist in a plurality of balls seated into conveniently positioned bores, all leading into the piston rod axial bore. The first of such balls is engaged against the end of the rod fitted in the piston rod axial bore, while the last ball is engaged against the end of a screw fitted in the shock absorber casing, whereby when acting on said screw, the rod fitted into the piston axial bore can be moved axially, thus adjusting the throttling element in respect of metering orifice on the piston.

To adjust the damping-out action, at least one of the chambers of shock absorber is combined with adjustable throttling elements, which allow to vary the free section of passage of ports through which the fluid is squeezed from one chamber into the other.

The further design and operational features of the shock absorber of this invention will be disclosed in the following description of a preferred embodiment thereof, taken with the accompanying drawing, and both description and drawing being given only as a restrictive example.

A shock absorber which can be advantageously fitted on cars in general, is shown on same drawing, in which:

Fig. 1 is a view of shock absorber according to the invention.

Figs. 2 and 3 are axial cross section of details of same shock absorber.

Figure 4B:
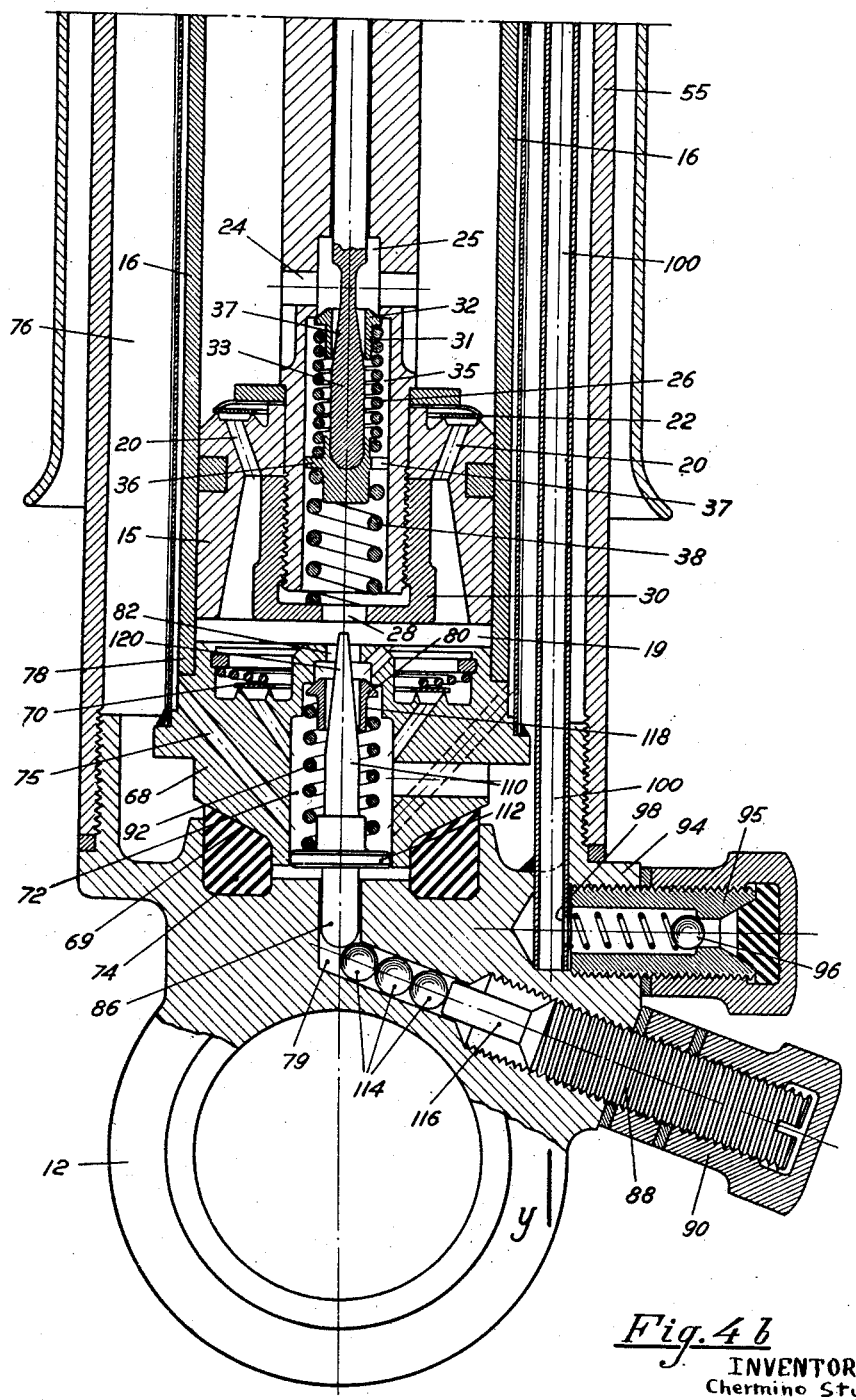
Figs. 4a and 4b is an axial section of a variant of the shock absorber.

Referring now to Figs. 1 to 3 inclusive, 10—12 are the connecting elements or rings of shock absorber.

A rod 14 is secured to the first of such rings. A piston secured to opposite end of said rod slides within a cylinder 16, secured to the other connecting ring 12 in the manner which will be hereinafter explained.

The two chambers 18 and 19, as defined by the piston 15 in the cylinder 16, are put into communication with each other through ports or orifices 20 on the piston 15, which are controlled by a spring disc valve of the non-return type, which allows a squeezing of fluid only from chamber 19 to chamber 18.

A second way of communication between the aforestated two chambers is established, to the purposes of this invention, by radial holes drilled on the piston rod 14, leading all into a collecting chamber 25 machined axially on same piston rod, and which extends as in 26 all along the piston rod, to lead into the chamber 19 through a hole 28 drilled on a fastening element 30, screwed into the piston rod 14, and by which the piston 15 is fastened to its piston rod.

The communication between the chambers 25 and 26, and thus between the chambers 18 and 19, is controlled by a throttling element 32, that consists in a valve which can be more or less lifted out of its seat.

Such a valve is fitted on an extension 33 of a rod 34, seated into an axial bore machined on the rod 14, and is kept engaged against the stop formed by the extension 33 and piston rod 34 by a spring 35, which lower end is fastened a retaining bottom disc 36 provided with radial openings allowing the fluid to flow therethrough, and that is slidingly fitted in the chamber 26 machined on the opposite end of rod 14.

The opposite face of bottom disc is acted upon by a second spring 38, the action of which prevails over that of aforestated spring 35.

Said spring 38 is retained by the fastening element 30, and it causes only a small deflection of superposed spring 35, since its action is restrained by the engagement of bottom disc 36 against the end of extension 33 of rod 34.

As shown in the Fig. 3, an inclined recess 37 is machined on a suitable position on one side of rod 33, thus bringing about a further way for the flow of fluid, for the purposes which will be stated hereinafter.

The opposite end of rod 34 is positioned approximately in the region of the end of rod 14. A screw 40 has an inclined end face which acts as bottom of axial bore in rod 14 forming a chamber between screw 14 and rod 34.

This chamber communicates with an oblique bore 42 drilled on the head 10 in such a manner that the axis of said bore be positioned sidewise to the shock absorber body.

The balls 44 are seated both in the bore 42 and in the chamber at the end of the axial bore in the rod 14. The first of said balls is engaged against the free end of rod 34, while the last ball is engaged against a pin fitted on a screw 46 screwed into a tapped hole which can be considered as a further extension of the bore 42. The tapped hole 42 is closed by a screwed cap which allows access to the screw 46.

The cylinder 16 is closed on one end by an end member 50, acting also as a guide element for the rod 14. End member 50 is connected, through an elastic cushion 52, with the bottom 54 of a cylindrical casing or outer cylinder member 55, inside of which the cylinder 16 is coaxially fitted. Said end member is axially connected to the casing 55 by means of the resilient portion 56.

The resilient cushion 52 is bored to allow the rod 14 to pass therethrough, and profile grooves 58, filled with a lubricant for said rod, are cut on the inside face of said bore. Said resilient cushion 52 is forced into its seat by the action of a spring 60, interposed between the sleeve 50 and said cushion, and that acts on the profile bottom disc 62 in order to exert on the resilient cushion the pressure required to cause it to adhere firmly to rod 14.

The orifices 64 on sleeve 50 are designed to put the chamber wherein the spring 60 is fitted, into communication with an annular chamber 65, as defined by the outside walls of cylinder 16, and by a tubular diaphragm 66 secured to said sleeve 50. This in order to allow a recovery of the fluid which might possibly flow from the chamber 18 into the chamber wherein the spring 60 is fitted.

The opposite end of cylinder 16 is closed by an end member 68, provided with a spring loaded, non return valve 70, which allows the communication between a chamber 72, and the superposed chamber 19 of cylinder 16.

The sleeve 68 is combined with a resilient ring-shaped cushion member 74 that rests onto the bottom of chamber 72 with which the aforestated connection element 12 is provided. The purposes of such a resilient ring, as well as of cushion 52, will be explained in detail hereinafter.

The chamber 72 is put into communication with the aforecited annular chamber 65 by means of the orifice 75. Latter chamber 65 is put on its turn into communication with an annular chamber 76 as defined by the outside walls of tubular diaphragm 66 and by the casing 55, through the orifices 78, machined on the lower section of tubular diaphragm 66.

As it can be readily appreciated from the drawing, the head with which the connection ring 12 is provided, is screwed into the lower section of casing 55, being thereby the resilient ring 74 forced into its seat.

The chamber 72 is put into communication with a transverse chamber 79 with which the head 12 is provided. Such a chamber is closed by a valve 80, that controls the communication between it, and a corresponding bore 82, which could be considered as the extension of same chamber and that leads on its turn into an annular chamber 84, located in the upper section of head 12, and likewise defined by a portion of outside surface of elastic ring 74.

Moreover, the chamber 84 is put into communication with the chamber 19 through the transverse orifices 85, radially drilled on the sleeve 68.

The valve 80 is slidingly fitted on a rod 86, secured to a threaded head 88, which can be screwed and adjusted into a corresponding tapped hole, machined on the head 12, and that is normally closed by the threaded cap 90.

Said rod 86 is provided with a spring 82, by which the valve 80 is forced against its seat machined between the chambers 79 and 82.

It will be apparent that, by acting on the threaded head 88, the possibility is given to adjust the pressure exerted on the valve 80 and thus to control the flow of fluid between the chambers of shock absorber, thereby adjusting also the damping-out action thereof.

A bored extension piece 94, that is encountered on the head 12, near the screwed cap 80, is provided with a filling-up nozzle 95, controlled by a spring valve 96, having the purpose to prevent the pressure fluid from flowing back. Said filling-up nozzle 95 communicates with a hole 98 drilled on the head 12, and that leads into an overflow pipe 100 fitted in the chamber 76, to establish a given level of fluid therein.

The upper section of said chamber is put into communication with the outside through a hole 102 machined on the sleeve 50 and controlled by a spring non-return valve 104 which allows, when operated, the communication between the chamber 76 and the outside.

The shock absorber, as previously described, is then completed by a protective sheath 106, secured to head 10.

As to the operation of shock absorber, it must be kept in mind that it is designed to work in a substantially vertical position, i. e. with the head 10 directed upward.

First of all, the shock absorber is to be charged or filled-up through the nozzle 95. A fluid, as f. i. a hydraulic oil, is filled through said nozzle into the chamber 76 up to the level as established by the upper end of overflow pipe 100. The upper section of chamber 76, above of max. level attained by the fluid, is then filled with compressed air, under a suitable pressure as established by the characteristics of the spring acting on the valve 104.

The oil with which the chamber 76 is filled-up, flows also into the coaxial chamber 65 through the orifices 78 of tubular diaphragm 76; then it flows therefrom into the chambers 72 and 79 through the orifice 75 whereupon, after having lifted the valves 70 and 22, it flows respectively into the chambers 18 and 19.

The chamber 18 is kept only partially filled with oil, while the remaining portion is filled with compressed air. After such a filling-up operation, the shock absorber is conveniently adjusted, i. e. the orifices through which the chambers 18 and 19 are put into communication each other, are more or less throttled through the bores 24, 26 and 28 of rod 14. More precisely, such an adjustment is brought about by acting on the screw 46 so as to displace the rod 34, and thus the valve 36, against the action of spring 38 and through the balls 44. All this results also in a motion of inclined recess 37, whereby the section of the orifice through which the chambers 18 and 19 are put into communication gets more or less throttled, thus varying also the degree of shock damping-out action.

As it can be readily appreciated from Figs. 4a and 4b, such an adjustment allows to obtain the limit results as hereinafter stated. The free area of passage between the chamber 18 and 19 and vice versa, as defined by the groove or inclined plane machined respectively on the rod 34 and on the corresponding extension 33, can be decreased to a minimum, i. e. to the light cross section of groove 37 cut on the rod 34 as shown on Fig. 3, or even can be completely shut-up.

The free area of aforestated passage can be, on the contrary, increased to a maximum by acting on the rod 34 through the screw 46 and the balls 44 whereby, by displacing said rods against the action of spring 38, the valve 32 is lifted from its seat, taking the position as shown by Fig. 4. In such a latter case, the free area of orifice or passage is made-up by the sum of the max. cross section of the groove 37, and by the annular passage that is left free by the valve 32 when lifted out of its seat.

After such preliminary operations, the shock absorber is ready to operate.

Now, when a sudden shock is transmitted to the two sliding components of shock absorber (i. e. the piston 15 and the cylinder 16) whereby the two heads 10—12 are driven away from each other, such a motion is braked and damped-out by the hydro-pneumatic cushion as provided in the chamber 18.

It must be noted that in the case of the hydraulic shock absorber as aforedescribed, such a first damping-out action is assisted by a concomitant cushioning action due to the presence of resilient cushion 52 located between the sleeve 50 and the bottom 54 of casing 55 secured to head 12.

The increase in volume of chamber 19 is automatically compensated for by the fact that the fluid contained in the chamber 76 is now caused to flow back into same chamber 19 through the orifices 78—75, chamber 72 and valve 70. Should the damping-out action be unusually hard, whereby the velocity with which the fluid flows back into the chamber 72 cannot be sufficient, a further volume of fluid is allowed to flow through the recovery valve 80, thus preventing a depression from being brought-up within the chamber 72.

At the end of the action exerted by such a shock, the shock absorber is brought smoothly back in its initial position, due to the escaping of the excess of fluid collected within the chamber 19, through the orifices 20, into the upper chamber 18. The flow speed of such a fluid is kept practically constant, and this independently from the blow through losses due to wear of piston 15 and of cylinder 16. In case an unusually hard shock directed in a direction opposite to that considered before, i. e. tending to drive the heads 10—12 nearer one another, is transmitted to the elements of shock absorber, such an action will be terminated by a reaction against the sleeve 68, being then absorbed by the elastic ring 74, retained by the head 12.

By considering what is about stated, it will be apparent that the velocity with which the piston moves from the position reached as consequence of the shock, back in its initial position, shall be constant when the free area of the orifice between the chamber 18—19 is kept also constant. However, such a condition will never exist in the practice, since the free area of passage gradually increases, due to wear of piston. More precisely: the flow of fluid from the chamber 19 to chamber 18 will take place not only through the orifices 20 and the groove 37, but also through the opening of valve 32. The area of such a free passage attains its maximum when the shock absorber is new, i. e. when the sliding components are not yet worn. Then, with the gradual wear of movable elements, a blowthrough of fluid through the bores 20 and 24—26 and also between the piston and cylinder occurs, whereby a change takes place in the shock damping-out action. When, the initial conditions can be restored by acting on the screw 46, whereby the free area of passage of orifices 24—26, controlled by the valve 32, is proportionally decreased. It follows that the blowthrough of fluid due to wear of movable elements will be compensated by the decrease in the free area of auxiliary passage (valve 32 and corresponding seat), with respect to that of main passage (orifices 20).

Figure 4A:
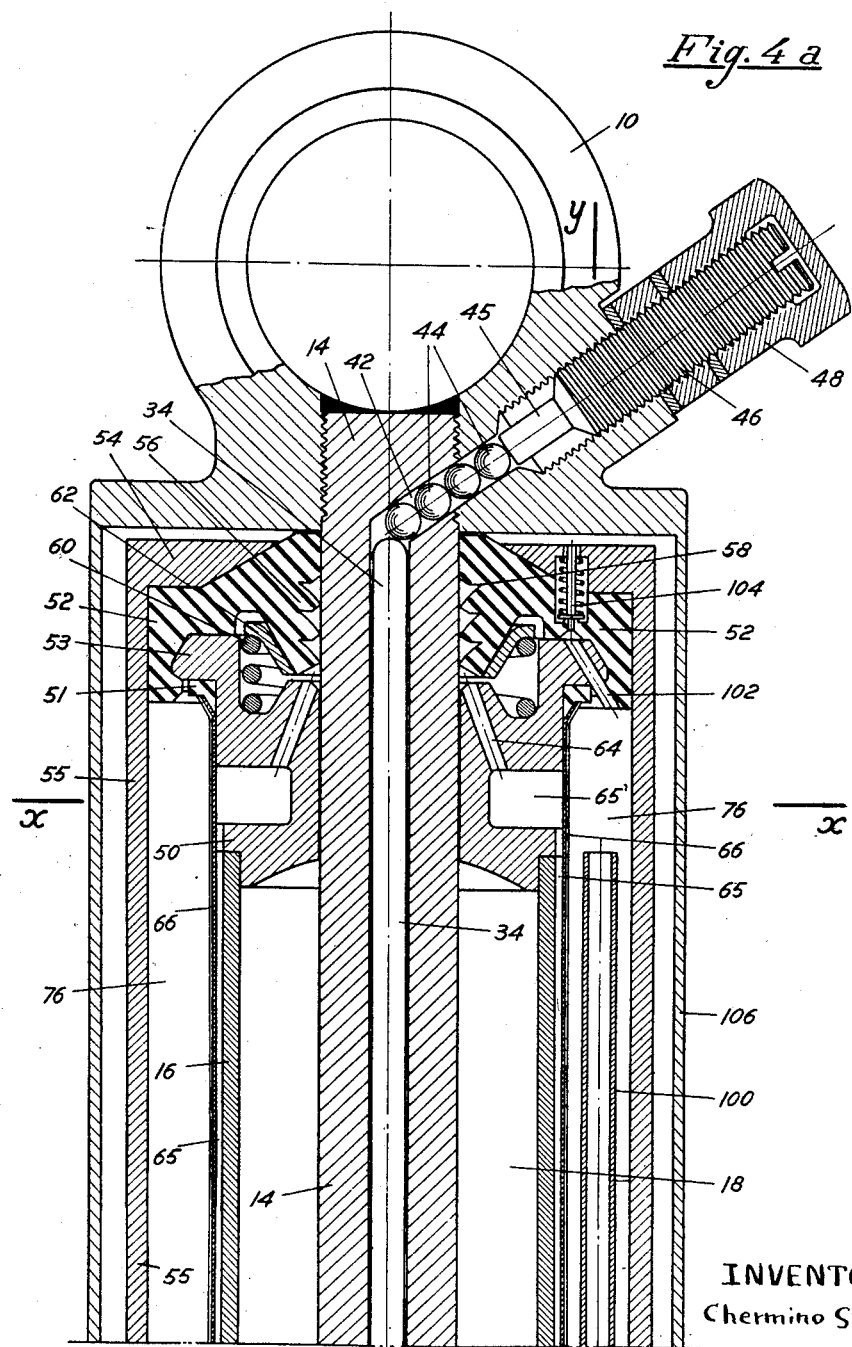

In the variant as shown in the Figs. 4a and 4b, wherein the component parts similar to those of Figs. 1 to 3 inclusive, are marked with same reference numbers, the sleeve 50, by which the end of cylinder 16 is closed and that serves also to retain the tubular diaphragm 66 through the annular packing 51, is provided with an end rim 53, that engages into a corresponding seat machined on the resilient cushion 52, which is provided on its turn with a counter-rim, whereby an elastic engagement between said both parts is established.

Thus, the wear which would otherwise take place when the rod 14 is stressed by a force tending to displace it laterally, or at any rate to deflect it in respect of the axis of corresponding cylinder 16, can be minimized.

The bottom disc 62, combined with the resilient cushion 52, is shaped in such a manner that under the action of spring 60, it is forced against the inside rim through which the rod 14 is passed, whereby said rim is kept always into tight contact with said rod.

The rod 34 shows near to its end, a narrowed-out section 37′, which cone angle can be suitably varied according to the purposes which are intended to attain.

Such a narrowed-out section 37′ is positioned in the bore of a sleeve 31, provided on one end with a truncated cone shaped rim 32, acting as a valve against a seat formed by an annular shoulder machined all around the orifice 26. Aforestated sleeve is kept under the action of the spring 38 acting against the bottom disc 36, that on its turn works against the end of piston rod 33, whereby also latter rod is kept under the action of aforestated spring.

The bottom disc 36 is slidingly guided in the bore 26, and lateral openings 37 are machined therein, whereby the fluid is allowed to flow into said bore 26.

The opposite end of cylinder 16 is closed by a bottom disc 68 being the opposite end of tubular diaphragm 66 also secured thereto. Said bottom disc ends with a truncated cone shaped extension piece 69 which engages into a seat machined on the resilient ring 74. Latter ring is designed to act as a resilient insert between the connection element 12 and the cylinder 16, as well as to keep said cylinder 16 duly centered, allowing also latter cylinder 16 to go, when required, out of alignment in respect of corresponding connection element 12 (as already stated for the cushion 52).

The bottom disc 68 is also provided with adjusting means for the control of hydraulic passages between the chamber 19, the chamber 72 and thus also the chamber 76, acting as reservoir for the fluid, whereby the possibility is given to change the free opening area of said passages. Such adjusting means consists in a stem 110, positioned along the longitudinal axis of shock absorber and provided with a rim 112 that cooperates with the walls of the bore 72, machined on bottom disc 68, thereby acting as a guide for the aforestated stem. The lower end of said stem engages into a hole 79, drilled axially on the connecting element 12, the end section of which is suitably bent, being the balls 114 seated therein. The first of such balls engages against the end of the stem in question, while the last ball engages against an extension piece 116 of a screw 88, screwed into a tapped hole, drilled coaxially to bent end extension of the hole 79. Such a screw can be actuated from the outside, and it is protected by a cap 90.

The stem 110 is kept into engagement with the balls 114 by means of a spring 92 wound therearound, the opposite end of which cooperates with a sleeve 118, whereinto the narrowed-out section 120 of the stem 110 is engaged. One end of sleeve 118 is provided with a truncated cone shaped rim 80, acting as a valve, and by which the orifice between the chambers 19 and 72 is controlled.

An overflow pipe 100 is fitted in the annular chamber 76 acting as a reservoir both for the fluid and for the pressure air, in such a manner as to maintain a given level of fluid therein in either vertical or horizontal position of shock absorber.

Such a level of fluid is indicated in the drawing with the line X—X when the shock absorber is in its vertical position and with the line Y—Y when same shock absorber is working in its horizontal position.

The operation of latter shock absorber is substantially identical with that of the previously described type.

The possibility is given to control the fluid transferring speed both between the chambers 18 and 19 (by means of the narrowed-out section of stem 37' which is moved in respect of the bore of sleeve 31 by the action of screw 46 and thus of the rod 34) and between the chambers 72 and 19.

In this latter case, the flow of fluid can be controlled by moving the narrowed-out end 120 of stem 110 under the action of screw 88.

Should the fluid present in the chamber 19 be submitted to a sudden and hard shock (which shock, as already stated, is absorbed also with the aid of resilient ring 74) then the excess of pressure can be discharged through the valve 80, which slides freely over the stem 110 against the action exerted thereon by the spring 92.

A similar procedure occurs when the fluid present in the chamber 18 is subjected to a sudden increase of pressure. In such a case the shock is partially absorbed by the resilient cushion 52, whilst the excess of pressure can be discharged through the valve 32, after this latter has been lifted out of its seat against the action of spring 35.

On the basis of the afore considerations, it will be understood that by acting on the screws 46 and 88, the possibility is given to adjust the damping-out action, both during the shortening and the lengthening steps.

Moreover, it will be apparent, as already stated, that all sudden axial stresses, and the consequent, unavoidable transverse stresses, are transmitted by the cylinder-piston unit 15—16, to correspondent resilient cushions 52—74, acting as efficient auxiliary shock dampers, and which ensure in any case the accurate centering of such a cylinder-piston unit in respect of connection elements 10—12.

The aforespecified and illustrated device—and above all the resilient cushions 52—74 designed to keep the cylinder-piston unit 15—16 duly aligned and to absorb the sudden shocks—can be advantageously fitted even to shock absorbers of the already known type, being such an application included within the scope of the invention.

As it will be readily appreciated, variations and changes might be made to previously described and illustrated shock absorber, according to operational requirements.

Thus, f. i., the shock absorber might be designed in such a manner as to give the possibility to adjust the lift of valve 22, and thus the passage thereby allowed, according to wear of shock absorber components.

What I claim is:

1. A shock absorber comprising, in combination, a cylinder member formed with a cylinder chamber and with a reservoir chamber for receiving operating fluid and with conduit means connecting one end of said cylinder chamber with said reservoir chamber, said cylinder member being formed with a bore opening on the outer surface thereof; a piston member including a piston head slidably mounted in said cylindrical chamber, and a piston rod projecting out of said cylinder member, said piston head defining in said cylindrical chamber two chamber portions, said piston members being formed with a passage means connecting said chamber portions; adjustable valve means in said conduit means for adjusting the cross section thereof and thereby the amount of operating fluid flowing between said cylindrical chamber and said reservoir chamber; and operating means including a set of balls mounted in said bore of said cylinder member, the innermost ball of said set of balls being connected to said adjustable valve means; and adjusting means mounted on said cylinder member and having a portion located in said bore and engaging the outermost ball of said set of balls so that said adjustable valve means may be adjusted while the shock absorber is mounted on a vehicle.

2. A shock absorber comprising, in combination, a cylinder member including an inner cylinder means, and an outer cylinder means, said inner cylinder means being formed with a cylinder chamber, and said inner and outer cylinder means defining together an annular reservoir chamber, said cylinder member being formed with a conduit means connecting one end of said cylinder chamber with said reservoir chamber; a pair of first end members closing said inner cylinder means; a pair of second end members closing said outer cylinder means; a pair of resilient cushion end members, each cushion member being located between one of said first end members and one of said second end members; a piston member including a piston head slidably mounted in said cylindrical chamber and a piston rod projecting out of said cylinder member, said piston head defining in said cylindrical chamber two chamber portions, said piston member being formed with a passage means connecting said chamber portions, said passage means including a transverse bore passing through said piston rod, said piston rod being further formed with a longitudinal bore; a valve stem slidably mounted in said longitudinal bore and being formed with a recessed portion connecting said transverse bore with said passage means; valve member located in said passage means and connected to said valve stem for movement in one opening direction; a spring urging said valve member into a closing position; adjustable valve means in said conduit means for adjusting the cross-section thereof; first operating means passing through said cylinder member and having an inner end connected to said adjustable valve means and an outer end located outside of said cylinder member; and second operating means passing through said longitudinal bore in said piston member and having an inner end connected to said valve stem, and an outer end located outside of said piston member so that said valve stem and said valve member may be adjusted while said shock absorber is mounted on a vehicle.

3. A shock absorber comprising, in combination, a cylinder member formed with a cylinder chamber and with a reservoir chamber for receiving an operating fluid, and with a conduit means connecting one end of said cylindrical chamber with said reservoir chamber, said cylinder member being formed with a bore opening on the outer surface thereof; a piston member including a piston head slidably mounted in said cylindrical chamber and a piston rod projecting out of said cylinder member, said piston head defining in said cylindrical chamber two chamber portions, said piston member being formed with a passage means connecting said chamber portions, said passage means including a transverse bore passing through said piston rod, said piston rod being further formed with a longitudinal bore; a valve stem slidably mounted in said longitudinal bore and being formed with a recessed portion connecting said transverse bore with said passage means; a valve member located in said passage means and connected to said valve stem for movement in one opening direction; a spring urging said valve member into a closing position; adjustable valve means in said conduit means for adjusting the cross-section thereof; first operating means including a set of balls mounted in said bore of said cylinder member, the innermost ball of said set of balls being connected to said adjustable valve means; first adjusting means mounted on said cylinder member and having a portion located in said bore and engaging the outermost ball of said set of balls; another set of balls located in said longitudinal bore; and second adjusting means mounted on said piston member and having a portion projecting into said longitudinal bore and engaging a ball of said other set of balls for moving said valve stem.

4. A shock absorber as claimed in claim 1 wherein said bore of said cylinder member has an inner axially extending portion, and an outer oblique portion opening on the outer surface of said cylinder member.

5. A shock absorber as claimed in claim 2 wherein said piston head is formed with a duct connecting said chamber portions; and including resilient valve means for closing said duct.

6. A shock absorber comprising, in combination, a cylinder member including an inner cylinder means, and an outer cylinder means, said inner cylinder means being formed with a cylinder chamber, and said inner and outer cylinder means defining together an annular reservoir chamber, said cylinder member being formed with a conduit means connecting one end of said cylinder chamber with said reservoir chamber; a pair of first end members closing said inner cylinder means; a pair of second end members closing said outer cylinder means; a pair of resilient cushion end members, each cushion member being located between one of said first end members and one of said second end members; a piston member including a piston head slidably mounted in said cylindrical chamber and defining two chamber portions therein, and a piston rod projecting out of one end of said cylinder member and passing through one of said end members, and through one of said resilient cushion end members, said piston member being formed with a passage means connecting said chamber portions; and a pair of connecting means, one of said connecting means being secured to one end of said cylinder member, and the other of said connecting means being secured to said piston rod, said connecting members being adapted to connect the shock absorber to a vehicle.

7. A shock absorber as claimed in claim 6 and including adjustable valve means in said passage means and in said conduit means; first operating means mounted on said cylinder member and having an inner end connected to said adjustable valve means in said conduit means; and second operating means having an inner end connected to said adjustable valve means in said passage means.

8. A shock absorber as claimed in claim 6 wherein said resilient cushion members have annular shapes.

9. A shock absorber as claimed in claim 6 wherein at least one of said first end members has frusto-conical shape, and wherein the corresponding resilient cushion end member is formed with a corresponding frusto-conical depression for receiving said end member.

10. A shock absorber as claimed in claim 8 wherein the annular cushion members through which said piston rod passes is formed with a plurality of grooves surrounding said piston rod and adapted to receive a lubricant.

11. A shock absorber as claimed in claim 6 wherein at least one of said resilient cushion end members is formed with a central depressed portion; a dished member located in said central depressd portion; and spring means intermediate said dished member and the corresponding end member.

12. A shock absorber as claimed in claim 6 wherein at least one of said resilient cushion end members is formed with a transverse annular recess; and wherein the corresponding end member is formed with a transverse flange projecting into said annular recess.

References Cited in the file of this patent
UNITED STATES PATENTS

| | | |
|---|---|---|
| 1,365,030 | Flentje | Jan. 11, 1921 |
| 2,025,199 | Funston | Dec. 24, 1935 |
| 2,122,407 | Chisholm | July 5, 1938 |
| 2,148,839 | Rossman et al. | Feb. 28, 1939 |
| 2,182,034 | Oberstadt | Dec. 5, 1939 |
| 2,662,615 | Armstrong | Dec. 15, 1953 |

FOREIGN PATENTS

| | | |
|---|---|---|
| 290,983 | Great Britain | Nov. 15, 1928 |
| 462,424 | Italy | Mar. 17, 1951 |
| 467,389 | Italy | Dec. 5, 1951 |